UNITED STATES PATENT OFFICE.

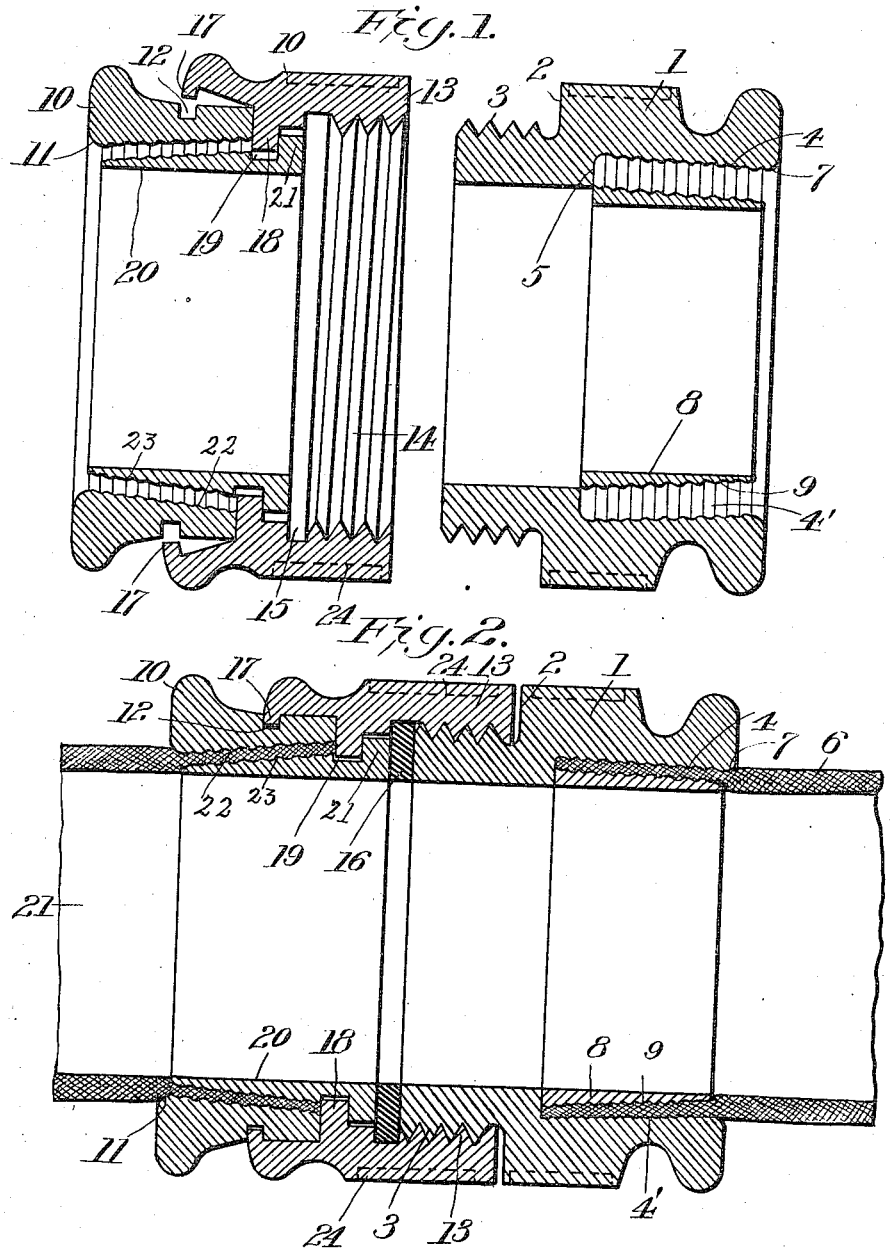

JOHN HALL STEPHENS, OF VERNON, TEXAS.

HOSE-COUPLING.

964,579.

Specification of Letters Patent.

Patented July 19, 1910.

Application filed December 2, 1908, Serial No. 465,600. Renewed December 14, 1909. Serial No. 533,116.

*To all whom it may concern:*

Be it known that I, JOHN HALL STEPHENS, a citizen of the United States, residing at Vernon, in the county of Wilbarger and State of Texas, have invented certain new and useful Improvements in Hose-Couplings, of which the following is a specification.

This invention relates to hose couplings. In hose couplings now in common use the flexible tubing is frequently weakened, if not damaged beyond repair, by the expansion of rings, sleeves, thimbles and the like against the interior of the tubing, and this defect is generally the result of expanding cylindrical rings and the like as much at their outer as at their inner ends. Moreover, considerable force is necessary to expand a cylindrical shaped ring in order that it may have the proper clamping effect upon the tubing to prevent accidental withdrawal of the latter from the coupling incident to a straight or longitudinal pulling action upon the tube, resulting either from heavy pressure or frequent or rough handling of the hose. Furthermore, by virtue of heavy pressure or rough handling of the hose, the latter becomes weakened at the ends of the coupling incident to frictional or other engagement with the sharp-edged mouths of the coupling, causing leakage in a comparatively short time.

It is therefore one object of my invention to provide a hose coupling whose parts are constructed and arranged to spread the inner ends of the hose sections and at their inner ends force the clamping thimbles into engagement therewith to a greater extent than the thimbles are forced into engagement with the hose sections at the mouths of the coupling and thereby anchor the hose sections in the end of the coupling against accidental longitudinal or a twisting withdrawal from the coupling.

Another object of the invention is to provide a hose coupling embodying among other characteristics a male and a female member, each provided with a removable clamping thimble for clamping the hose sections in the coupling, in combination with a coupling sleeve which has a swiveled engagement with one of said members and which also has swiveled engagement with the thimble disposed within the member with which the coupling sleeve has swiveled engagement, whereby the coupling sleeve secures not only the male and female members together, but also secures the thimble with which it has swiveled connection against longitudinal movement out of its inclosing member, thereby insuring a positive connection between one of the main members of the coupling, the coupling sleeve and one of the thimbles, consequently effectually holding the corresponding hose sections against withdrawal from the coupling when the thimble is expanded, and also preventing displacement of said thimble from the coupling prior to the insertion of the hose section.

A still further object of the invention resides in the provision of a hose coupling comprising in its organization of elements means whereby the inner ends of the hose sections may be spread considerably without placing undue strain upon the hose sections at the outer ends of the coupling so that the hose sections are anchored firmly at their extreme inner ends within the body of the coupling and at points where any undue strain thereupon which would even tear the fibers thereof incident to great force in expanding the hose sections, would not cause leakage as would be the case if the hose sections were subjected to as much strain at the extreme ends of the coupling as at points within the coupling, whereby I am enabled to effectually anchor the hose sections even to the extent of tearing the fibers thereof without a consequent leaking of the hose.

With the above and other objects in view, the present invention consists in the combination and arrangement of parts hereinafter more fully described, illustrated in the accompanying drawings, and particularly pointed out in the appended claims, it being understood that changes may be made in the form, proportion, size and minor details without departing from the spirit or sacrificing any of the advantages of the invention.

In the drawings:—Figure 1 is a longitudinal sectional view of the coupling prior to a complete assembling thereof. Fig. 2 is a longitudinal section view of the hose and coupling assembled.

Referring now more particularly to the accompanying drawings, the reference character 1 indicates the body of the male member, whose inner end is reduced to provide a shoulder 2, the reduced portion being screw threaded, as indicated at 3. The interior of the male coupling member is hollow with its outer internal portion tapered, as at 4, and of greater diameter than at its inner internal portion to provide an annular shoulder 5 against which the inner end of the hose section 6 is preferably disposed, the outer end of the male coupling at the edge of its larger internal portion being preferably rounded, as indicated at 7, to obviate a sharp edge and thereby prevent undue wear and consequent weakening of the hose at the mouth of the male member incident to frequent engagement of the hose section with the rounded edge due to pressure or handling of the hose.

The character 8 indicates a substantially cone shaped expansible thimble which, after the hose section 6 is disposed in the outer end of the male coupling 1 and against the shoulder 5 of the latter, is passed into the male coupling member from the inner end of the latter. This thimble 8 is tapered externally, as shown, and provided with concentric ribs 9 adapted to engage the interior of the hose section 6 to bind the latter between said thimble and the tapering internal portion 4 of the male member 1, when said thimble is expanded. It will be seen that the tapering internal portion 4 is provided with the concentric ribs 4' for the same purpose as that for which the ribs 9 of the thimble 8 are designed, except that the ribs 4' engage the outer surface of the hose section.

By virtue of the tapered clamping surfaces of the male member 1 and the thimble 8, the hose section 6 has its inner end spread or flared outwardly, thereby firmly anchoring the hose section at its extreme inner end and overcoming the possibility of a lateral, twisting, straight or longitudinal pulling action upon the hose incident to pressure or otherwise from pulling the hose section out of its anchored position.

Any suitable expanding tool (not shown) may be used to expand the thimble 8, but it will be understood that the thickened or shouldered inner end of the thimble is expanded to a lesser extent than the thinner outer end of the thimble. It will be noted that the outer end of the thimble is quite thin, as compared with the inner end thereof, and said method of expanding the thimble is followed for the purpose of placing most of the strain upon the hose at its extreme inner end rather than at the rounded outer end of the male member, so that the texture of the hose will not be strained or torn and thereby weakened at the mouth of the male member, and for the further purpose of preventing weakening of the hose at a point where it would be quickly subject to leakage incident to heavy pressure or handling of the hose. As a matter of fact, the fibers of the hose adjacent the inner end of the thimble may be torn by forcing the inner end of the thimble against the extreme inner end of the hose section without causing leakage owing to the strained texture being disposed within rather than at the end of the coupling. Moreover, by tearing the hose at its inner end where it is flared outwardly, incident to expansion of the thimble, there would be a greater binding action upon the hose which would assist in preventing the hose from being pulled out of position between the male member and the thimble. The same method of expanding the thimble of the female member 10, hereinafter described, is employed for the same purposes.

The female coupling member includes a body portion 10 which is hollow and which has its interior tapering from its inner to its outer end with the outer end thereof rounded, as indicated at 11, to obviate a sharp edge for the same reasons as stated in connection with the male member. The said body portion of the female member has an annular groove 12 formed in its exterior for a purpose presently explained. The female member also includes a coupling sleeve or nut 13 which is designed to couple the male and female members together, and this sleeve has its internal portion screw threaded, as at 14, for coöperation with the screw threads 3 of the male member 1. The sleeve also has an annular shoulder 15 against which is disposed a gasket 16 adapted to bear against the inner end of the male member 1 when the male and female members are coupled in coöperative relation for the purpose of preventing leakage and also to form a yieldable connection between the abutting ends of the male and female members. This sleeve 11 is also provided with spaced annular shoulders 17 and 18, the shoulder 17 assuming the position shown in Fig. 1 prior to its contraction into the annular groove 12 of the body portion 10 of the female coupling member 10, as shown in Fig. 2.

The annular shoulder 17 of the coupling sleeve 13 has free movement in the annular grooves 12 of the female member 10, so that the sleeve may have rotative movement upon the female member 10. The other annular shoulder 18 of the sleeve 13 is adapted for engagement in the groove 19 of the expansible thimble 20, which latter has a shoulder 21 at its inner end adjacent the groove 19 and adapted to overlap the shoulder 18 of the sleeve 13. This thimble 20 is inserted into the female member 10 after the latter is rotatively connected to the sleeve 13 by movement inwardly from the inner end of the female member 10.

It will be observed that the inner end of the female member 10 is disposed against the annular shoulder 18 of the coupling sleeve 13 and terminates at that point, while the thimble 20 extends inwardly beyond the inner end of the female member 10 when in operative position. The inner end of the hose section 21 is disposed in the body portion of the female member prior to the insertion of the thimble 20. After positioning the hose section 21 as just stated, the thimble 20 is inserted in the female member and is expanded in any suitable manner to force the shoulder 21 of the thimble 20 outwardly and also to force the groove 19 of the thimble 20 from the position shown in Fig. 1 to that shown in Fig. 2, to provide for a firm clamping of the inner end of the hose section 21 between the ribs 22 and 23 of the female member 10 and thimble 20, respectively, and also effectively provide for a positive union between the female member 10, the sleeve 13, and thimble 20, preventing accidental displacement of the latter. It will thus be seen that the thimble 20 of the female coupling member 10 not only coöperates with the female member to clamp the hose, but, by virtue of the groove 19 and shoulder 20, it also coöperates with the coupling sleeve 13 to reinforce the annular shoulder 17 to hold the coupling sleeve in true rotative position upon the female member 10. Hence, besides performing the function of a clamping thimble, the member 20 also performs the function of a swivel element. It also presents its shoulder 21 to such coöperative relation with the shoulder 15 of the sleeve 13 as to provide a broad bearing surface for the gasket 16.

The exterior of the sleeve 13 is provided with grooves 24 to receive a wrench or any other suitable implement (not shown) to permit of ready operation of the sleeve to draw the male and female members together or disconnect them. If preferred, the exterior of the sleeve 13 may be squared into rectangular, hexagonal or other shape for wrenching purposes in a manner well known in the art, and which is thought too obvious to illustrate.

From the foregoing, it will be understood that the expansible thimbles taper from their inner to their outer ends, in fact, in practice they are formed almost into a knife edge and at their outer ends they are quite thin. It will also be understood that the expansion of these thimbles occurs preferably at their inner enlarged ends to expand the inner ends of the hose positions considerably at their inner extremities, but only slightly at the points adjacent the outer ends of the coupling. The result is that the fibers of the hose are not broken by the expansion of the thimbles at the outer ends of the latter, and consequently weakening of the hose at the outer ends of the coupling is obviated. Flexible hose when placed under heavy pressure expands considerably, and even if the hose is not weakened by the expansion of the thimbles, there is considerable friction and consequent wear upon the hose at the mouths of the coupling incident to expansion of the hose and other strain thereupon, and in many instances the hose eventually breaks and leaks at the mouths of the coupling. In the present instance, by virtue of the thin outer ends of the thimbles and expansion thereof at their inner ends, and the fact that the outer ends of the male and female members are rounded, there is little, if any, possibility of the hose being subjected to undue wear at the mouths of the coupling incident to heavy pressure or for other reasons.

Of course my improved coupling is applicable to connect pipe sections as well as flexible hose.

Having thus described my invention, what I claim and desire to secure by Letters Patent is—

1. A hose coupling comprising a male member, a female member composed of a body portion and a sleeve, the body portion of the female member having an external groove, a clamping thimble in each of said members, the thimble in the female member having a groove and also a shoulder, said sleeve having shoulders, one shoulder for engagement in the groove of the body portion of the female member and the other shoulder for engagement in the groove of the thimble in the female member and adapted to overlap the shoulder of the thimble.

2. A hose coupling comprising a male member, a female member composed of a body portion and a sleeve, the body portion of the female member having an external groove, a clamping thimble in each of said members, the thimble in the female member having an annular groove and also an annular shoulder, said sleeve having annular shoulders, one shoulder for engagement in the groove of the body portion of the female member and the other shoulder for engagement in the groove of the thimble in the female member and adapted to overlap the shoulder of the thimble in advance of the latter.

3. A hose coupling comprising a male member, a female member composed of a body portion and a sleeve, the sleeve being adapted to couple said members together, thimbles in said members, said sleeve having swiveled engagement with one of said members and also having swiveled engagement with the thimble in the female member to hold said latter thimble against movement outwardly of its member.

4. A hose coupling comprising a male member, a female member composed of a body portion and a sleeve, the body portion of the female member having an external groove, a tapering clamping thimble in each of said members, the thimbles tapering from their inner to their outer ends and the thimble in the female member having a groove and also having a shoulder at its inner end, said sleeve being adapted to couple said members together and having shoulders, one shoulder for engagement in the groove of the body portion of the female member and its other shoulder being adapted for engagement in the groove of the thimble in the female member and to overlap the shoulder of said thimble.

5. A hose coupling comprising a male member, a female member composed of a body portion and a coupling sleeve, the body portion of the female member having an external groove, a tapering clamping thimble in each of said members, the thimbles tapering from their inner to their outer ends and the thimble in the female member having an annular groove and also having an annular shoulder at its inner end, said sleeve having shoulders, one shoulder for engagement in the groove of the female member and the other shoulder for engagement in the groove of the thimble of the female member and adapted to overlap the shoulder of said thimble.

6. A hose coupling comprising a male member, a female member composed of a body portion and a coupling sleeve, tapering thimbles in said members, said sleeve having swiveled engagement with one of said members and also having swiveled engagement with one of the thimbles to hold said latter thimble against movement outwardly of its inclosing member.

7. A hose coupling comprising a hollow male member whose interior is of greater width in cross section at its outer end than at its inner end to provide a shoulder intermediate its ends, the enlarged interior portion of said male member being tapered, a thimble disposed in the enlarged interior portion of the male member and whose exterior is tapered for coöperation with the tapering surface of the enlarged interior portion of the male member to clamp the hose section between the male member and the thimble with its extremity in engagement with said shoulder, the inner end of the male member being externally screw threaded, a female member composed of a body portion and a sleeve, the interior of the body portion of the female member being tapered and its exterior provided with an annular groove, a thimble whose exterior is tapered for coöperation with the tapering surface of the body portion of the female member to clamp the hose section between them, said latter thimble having an annular groove and a shoulder at its inner end, said sleeve having a portion of its interior screw threaded for coöperation with the screw threaded portion of the male member and also provided with a pair of annular shoulders, one shoulder for engagement in the annular groove of the body portion of the female member and the other shoulder of said pair being arranged for engagement in said groove of the thimble in the female member and adapted to overlap the shoulder of said latter thimble, said sleeve also having another shoulder adjacent the shoulder of the thimble of the female member, and a gasket disposed against said two latter shoulders for engagement with the inner end of the female member when the male and female members are coupled together, the outer ends of the male and femal members being rounded.

8. A hose coupling comprising a male member, a female member composed of a body portion and a sleeve, a thimble in each member said sleeve having interlocking engagement with the female member and the thimble therein and adapted to couple said members together, and expansible thimbles for said members to clamp the hose between them and the members.

9. A hose coupling comprising a male member, a female member composed of a body portion and a sleeve, a thimble in each member, said sleeve having rotative interlocking engagement with the female member and also with the thimble in the female member whereby the sleeve may be rotated and whereby the thimble of the female member is held against accidental displacement.

10. A hose coupling comprising a male member having an internal tapering portion and also an internal shoulder, a tapering expansible thimble in the male member to coöperate with the tapering portion of the latter to clamp the hose in the male member against the shoulder of the latter, and a female member composed of a body portion and a sleeve, the body portion having a tapering interior, a tapering expansible thimble for engagement in the body portion of the female member for coöperation with the tapering portion of the latter to clamp the hose between them, said sleeves being adapted to couple the members together and having interlocking rotative engagement with the body portion of the female member and also with the thimble in the female member.

11. A hose coupling comprising a male member having an internal tapering portion and also an internal shoulder, a tapering thimble in the male member coöperating with the tapering portion of the latter to clamp the hose in the male member against the shoulder of the latter, a female member composed of a body portion and a sleeve, said body portion having a tapering interior, a tapering thimble engaging in the body portion of the female member coöperating with the tapering portion of said body portion, said sleeve being adapted to couple the members together and having interlocking rotative engagement with the female member and also with the thimble in the female member, the outer ends of the male and female members being rounded and the outer ends of said thimbles being reduced almost to a knife edge, with the knife edges thereof disposed adjacent the rounded ends of said members, and a gasket disposed against the inner end of the thimble of the female member for engagement with the inner end of the male member when said members are coupled together.

12. A hose coupling comprising coupling members, one of said coupling members being composed of a body portion and a coupling sleeve, and an expansible thimble for each coupling member, one of the thimbles being expansible into swiveled engagement with said sleeve.

13. A hose coupling comprising coupling members, one of said members being composed of a body portion and a coupling sleeve, a tapering expansible thimble for each member, one of the thimbles being expansible into swiveled engagement with said sleeve, said sleeve also having swiveled engagement with one of the members.

14. A hose coupling comprising a male member provided with an internal shoulder, a thimble in the male member to clamp the hose therein, a female member composed of a body portion and a coupling sleeve, said sleeve having swiveled engagement with said body portion, a thimble for the body portion of the female member to clamp the hose section therein, the thimble in the female member being expansible into swiveled engagement with said sleeve.

15. As an article of manufacture a coupling member for hose composed of a hollow body portion and a sleeve, the hollow body portion having its interior tapered, a thimble in said body portion with its exterior tapered and provided at its inner end with a shoulder and a groove adjacent the shoulder, said body portion also having an external groove, said sleeve having shoulders, one shoulder engaging in the groove of said hollow member and the other shoulder engaging in the groove of the thimble and overlapping the shoulder of the latter.

16. As an article of manufacture, a coupling member for hose composed of a body portion and a coupling sleeve, said sleeve having swiveled engagement with said body portion, and a thimble in said coupling member for swiveled engagement with said sleeve.

In testimony whereof I affix my signature, in presence of two witnesses.

JOHN HALL STEPHENS.

Witnesses:
   JOHN H. SIGGERS,
   GEO. C. SHOEMAKER.